United States Patent [19]

Oswald et al.

[11] Patent Number: 5,102,003
[45] Date of Patent: Apr. 7, 1992

[54] DRAIN PLUG RETAINER

[76] Inventors: John T. Oswald; Sarah Oswald, both of 438 Marlen Ct., Haysville, Kans. 67060; Clarence E. Poister, 1838 S. Laurel, Wichita, Kans. 67207-5818

[21] Appl. No.: 563,006
[22] Filed: Aug. 6, 1990
[51] Int. Cl.⁵ ............................................. B65D 55/16
[52] U.S. Cl. .................... 220/375; 220/230; 248/206.5; 24/303
[58] Field of Search .......... 220/375, 230, 379, 85 CH; 248/206.5, 309.4; 24/303, 299

[56] References Cited

U.S. PATENT DOCUMENTS

| | | | |
|---|---|---|---|
| 2,722,337 | 11/1955 | Lindsay | 220/375 X |
| 3,126,190 | 3/1964 | Miller | 248/206.5 |
| 3,393,824 | 7/1968 | Appleton | 220/375 X |
| 3,419,832 | 12/1968 | Baermann | 248/309.4 X |
| 3,490,177 | 1/1970 | Perrion | 220/375 X |
| 4,194,657 | 3/1980 | Thor | 220/375 X |
| 4,432,120 | 2/1984 | Sherman, Jr. et al. | 220/375 X |
| 4,653,711 | 3/1987 | Marshell | 220/85 CH X |
| 4,817,450 | 4/1989 | Jachim | 73/866.5 |
| 4,867,337 | 9/1989 | Eichenseer | 220/375 |

Primary Examiner—Stephen P. Garbe
Assistant Examiner—Vanessa M. Roberts
Attorney, Agent, or Firm—Robert K. Rhea

[57] ABSTRACT

An automotive crankcase drain plug retainer is formed by placing a relatively thin washer around the drain plug, between its head and the adjacent surface of the crankcase.

A permanent magnet mounted in a casing is connected with a radial tab on the washer by a flexible element. The casing magnetically contacts a crankcase to be drained, having the washer previously installed on its drain plug. The flexible element suspends the drain plug and washer when removed from the crankcase.

4 Claims, 1 Drawing Sheet

DRAIN PLUG RETAINER

BACKGROUND OF THE INVENTION

1. Field of the invention

This invention relates to tools and more particularly to a magnetic element for preventing loss of a drain plug when removed from a liquid container.

For economic and personal reasons many individuals at present, in addition to filling the gas tank of their automotive vehicle, do the maintenance work required for the upkeep of the automobile, such as changing the engine oil.

Since an automotive engine oil crankcase has its drain plug located at the lowermost portion of the crankcase, the removal of the drain plug without its dropping into the spent oil receiving container presents a problem, even for an experienced mechanic unless that individual does not mind having the spent oil running along his hand and possibly along his forearm.

In avoiding oil contact with the individual's hand a wrench is usually used after initially loosening the drain plug to continue unscrewing the plug from the crankcase. This results in the drain plug dropping into the drained oil container requiring a fishing job to regain it or pouring the oil into another container to retrieve the drain plug.

This invention eliminates the problem of maintaining the drain plug free of the spent oil draining into a receptacle.

2. Description of the prior art

Prior patents generally disclose flexible members extending between and interconnecting elements, one element being attachable to a fixed object such as an automobile fender and the other end attached to the filler cap of a fuel tank, or the like.

Other patents such as U.S. Pat. No. 4,817,450 discloses connecting a cap for a test plug inserted through the wall of a fluid vessel by split ring members respectively surrounding a centrally bored valve closed test plug and an annular groove in the test cap, with these split rings interconnected by a flexible member so that upon removing the cap it remains attached to the test plug.

This type of arrangement is not satisfactory with the drain plug for an automotive crankcase for the reason the plug itself must be removed from the crankcase in order for the oil to drain therefrom.

SUMMARY OF THE INVENTION

A relatively thin washer having a central opening substantially equal in diameter with the pitch diameter of the threads of an automotive drain plug surrounds the plug between the threads and its wrench-flat equipped head end. The washer further includes a radially projecting tab portion having an aperture.

A relatively short length of magnetic material channel having an apertured tab at each of its ends embraces one flat surface and opposing longitudinal sides of a rectangular permanent magnet thus magnetizing the channel member.

An endless ring received by one tab aperture is connected with one end of a flexible member having a part circular open hook connected with its other end and the open end of the hook removably received by the washer tab aperture.

The principal object of this invention is to provide an automotive crankcase drain plug retainer preventing the crankcase drain plug from falling into discharged used oil when draining an automotive crankcase.

DESCRIPTION OF THE PREFERRED EMBODIMENTS

Figure 1:
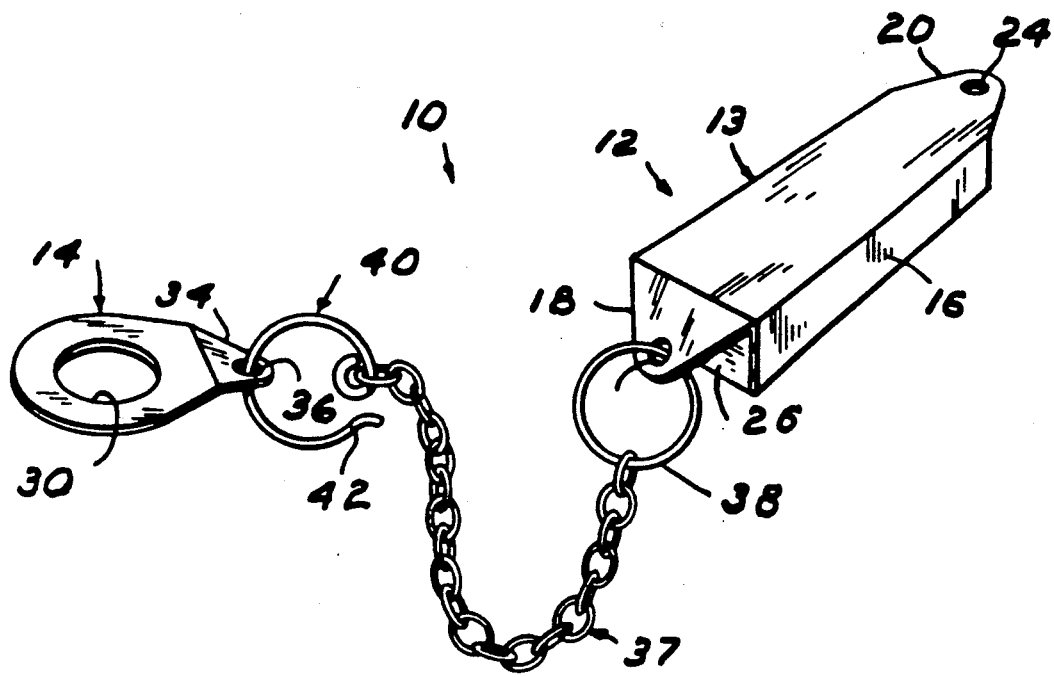
FIG. 1 is a perspective view of the device, per se.

Like characters of reference designate like parts in those figures of the drawings in which they occur.

In the drawings:

The reference numeral 10 indicates the device comprising a magnetic member 12 connected with a flat washer 14.

The magnetic member 12 comprises a casing 13 formed by a selected length of magnetizable U-shaped channel material having a pair of parallel legs 16, only one being shown, and longitudinally extending reduced width tab members 18 and 20 at the respective ends of its flat bight portion, each having an aperture 22 and 24, respectively, adjacent its remote end.

The washer 14 is relatively thin when compared with its outside diameter and is centrally drilled to form an opening 30 which loosely surrounds a crankcase drain plug 32. The washer 14 is provided with a radially extending tab portion 34 having an aperture 36. A flexible element such as a chain 37 connects the magnetic element 12 to the washer 14. An endless ring 38 at one end of the chain extends through an end link of the chain and the tab aperture 22 of the magnetic member. The other end of the chain has its endmost link connected with a closed loop on one end of an open generally circular hook 40 with the opposite free end portion 42 of the hook being slidably received by the washer tab aperture 36 so that the hook may be engaged with or removed from the washer 14 at the will of the user.

Referring again to the drain plug 32 mounted on an automotive crankcase indicated at 44, the drain plug 32 is bolt-like including a wrench-flat equipped head end 46 and a screw threaded shank portion, not shown, extending into a suitable internally threaded opening in the bottom wall of the crankcase 44.

The length of the plug 32 is, generally, substantially equal to the diameter of the threaded shank portion.

The diameter of the washer central opening 30 is substantially equal to the pitch diameter of the drain plug threads so that the washer may be installed on the drain plug adjacent the head 46 by angular rotation of the thin washer about the plug shank thus disposing the washer flatly adjacent the crankcase face of the plug head 46 in the annular thread relief, between the shank threads and the adjacent face of the bolt head. The washer 14, per se, normally remains installed on the drain plug.

OPERATION

Figure 2:
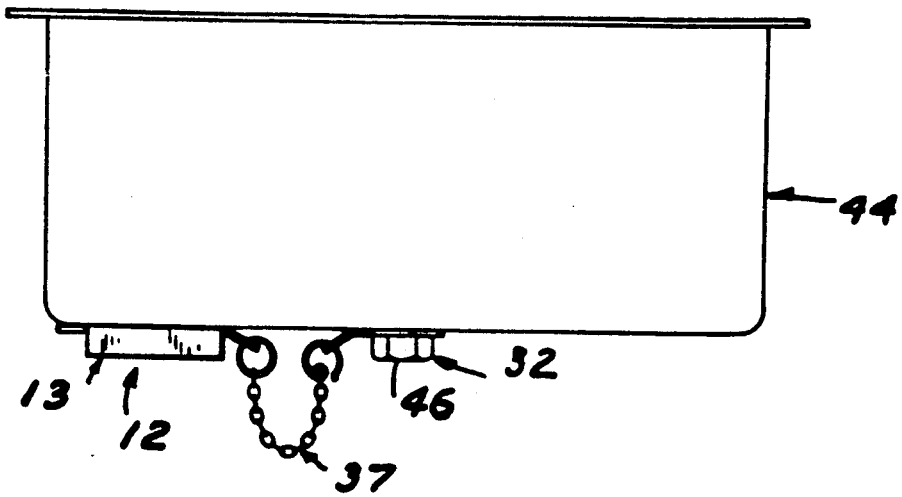
FIG. 2 is a side elevational view of an automotive crankcase having the device in place for removal of the drain plug.

In operation, assuming the washer has previously been installed on the drain plug 32 and a drain pan, not shown, is in place. In preparing to drain the crankcase 44 the operator places the magnetic element 12 in contact with the surface of the crankcase adjacent the drain plug position and engages the hook 40 with the washer tab opening 36, as shown by FIG. 2. Thereafter the drain plug is loosened and removed as by using a wrench. The edge defining washer opening 30, within the thread relief of the drain plug, permits the drain plug to be angularly rotated relative to the washer after the initial loosening of the drain plug from its seated position.

The drain plug 32 is then supported by the chain 37 in turn supported by the magnetic member 12. Obviously, the length of the chain 37 is selected to permit easy access to the drain plug position and prevent drain plug immersion in the drained oil. After replacing the drain plug 32 the hook 40 is released from the washer tab and the magnetic member 12 is stored for future use as by hanging its tab 20 on a wall mounted nail or the like.

Obviously the invention is susceptible to changes or alterations without defeating its practicability. Therefore, we do not wish to be confined to the preferred embodiment shown in the drawings and described herein.

We claim:

1. A retainer for supporting a bolt-like drain plug removed from a metallic liquid container, comprising:
   a U-shaped length of magnetizable channel having a flat bight portion and opposing parallel legs and having a longitudinally projecting tab portion at respective ends of its bight portion,
   said tabs being characterized by outwardly converging side edges terminating in an arcuately curved edge having an aperture adjacent the curved edge;
   a permanent magnet having adjacent planar surfaces flatly contacting the inner surfaces of the channel bight portion and its legs;
   a flat washer, relatively thin when compared with its outside diameter, and having a central opening capable of closely surrounding a drain plug adjacent its head end,
   said washer having a radially projecting apertured tab;
   a chain extending between one said channel tab and the washer tab;
   an endless ring extending through the aperture in said one channel tab and the link at one end of said chain; and,
   a part circular open hook having a closed loop at one end linked with the end link of the end of said chain opposite said one end,
   the end portion of said hook opposite the closed loop being removably received by said washer tab aperture.

2. A retainer for supporting a drain plug removed from a metallic liquid container, comprising:
   magnetic means including a magnetizable casing removably maintained on the container by magnetic attraction,
   said casing having an apertured tab;
   a washer surrounding the drain plug intermediate its ends, said washer having an aperture in its peripheral edge; and,
   an elongated flexible member connected at one end with said casing tab aperture and removably connected at its other end with said washer aperture.

3. The drain plug retainer according to claim 2 in which said casing comprises an elongated U-shaped channel having a planar bight portion and parallel legs and having an apertured tab projecting longitudinally from the respective end of the bight portion and said magnetic means further includes: a permanent magnet disposed between the channel legs.

4. The drain plug retainer according to claim 3 and further including:
   an endless ring interposed between one end portion of said flexible member and the aperture in one said casing tab; and,
   a part circular hook having a closed loop at one of its ends secured to the other end of the flexible member and having its end opposite said one end removably received by the washer aperture.

* * * * *